(12) United States Patent
Beutin et al.

(10) Patent No.: US 7,950,218 B2
(45) Date of Patent: May 31, 2011

(54) BYPASS TURBOMACHINE WITH ARTIFICIAL VARIATION OF ITS THROAT SECTION

(75) Inventors: Albert Bruno Beutin, Evry (FR); Eric Landre, Issy les Moulineaux (FR)

(73) Assignee: SNECMA, Paris (FR)

( * ) Notice: Subject to any disclaimer, the term of this patent is extended or adjusted under 35 U.S.C. 154(b) by 984 days.

(21) Appl. No.: 11/780,118

(22) Filed: Jul. 19, 2007

(65) Prior Publication Data
US 2008/0141656 A1 Jun. 19, 2008

(30) Foreign Application Priority Data

Aug. 1, 2006 (FR) ...................................... 06 53241

(51) Int. Cl.
*F02K 1/00* (2006.01)
*F02K 1/28* (2006.01)
(52) U.S. Cl. .................. 60/231; 60/785; 239/265.17
(58) Field of Classification Search ............ 60/262, 60/226.1, 226.3, 231, 782, 785, 795, 228; 239/265.17, 265.23
See application file for complete search history.

(56) References Cited

U.S. PATENT DOCUMENTS

| | | | | |
|---|---|---|---|---|
| 2,703,477 A * | 3/1955 | Anxionnaz | ...................... | 60/262 |
| 3,000,178 A * | 9/1961 | Logerot | ................... | 239/265.17 |
| 3,641,766 A * | 2/1972 | Uehling | ........................... | 60/262 |
| 4,254,618 A * | 3/1981 | Elovic | .......................... | 60/226.1 |
| 5,291,672 A * | 3/1994 | Brown | ............................ | 60/262 |
| 5,435,127 A | 7/1995 | Luffy et al. | | |
| 5,947,412 A * | 9/1999 | Berman | ........................ | 244/1 N |
| 5,996,936 A * | 12/1999 | Mueller | ........................ | 244/53 R |
| 6,021,637 A | 2/2000 | Scavo | | |
| 6,227,800 B1 * | 5/2001 | Spring et al. | ................... | 415/116 |
| 6,308,740 B1 | 10/2001 | Smith et al. | | |
| 6,308,898 B1 * | 10/2001 | Dorris et al. | ............. | 239/265.17 |
| 6,679,048 B1 * | 1/2004 | Lee et al. | ......................... | 60/204 |
| 7,055,329 B2 * | 6/2006 | Martens et al. | ................. | 60/772 |
| 7,159,383 B2 * | 1/2007 | Barton et al. | ................. | 60/226.1 |
| 7,246,481 B2 * | 7/2007 | Gutmark et al. | ................. | 60/204 |
| 7,730,714 B2 * | 6/2010 | Wood et al. | ................... | 60/226.1 |
| 2003/0182925 A1 | 10/2003 | Lair | | |
| 2008/0112798 A1 * | 5/2008 | Seitzer et al. | ................. | 415/144 |
| 2008/0230651 A1 * | 9/2008 | Porte | .......................... | 244/118.5 |
| 2009/0293449 A1 * | 12/2009 | Venter | .......................... | 60/226.1 |

FOREIGN PATENT DOCUMENTS

EP 1 004 759 A2 5/2000

* cited by examiner

*Primary Examiner* — William H Rodríguez
(74) *Attorney, Agent, or Firm* — Oblon, Spivak, McClelland, Maier & Neustadt, L.L.P.

(57) ABSTRACT

The invention relates to a bypass turbomachine comprising a gas turbine engine provided with a fan disposed on a longitudinal axis of the turbomachine, and an annular nacelle surrounding the engine so as to define a cold stream flow channel, the nacelle having an upstream end surrounding the fan of the engine and a stationary downstream end forming a gas exhaust nozzle, the nozzle having a throat section that corresponds to its smallest cross-section. The turbomachine further comprises means for taking in air from the cold stream flow channel upstream from the nozzle throat section, and means for injecting the taken-in air downstream from the nozzle throat section so as to open the throat section artificially.

8 Claims, 2 Drawing Sheets

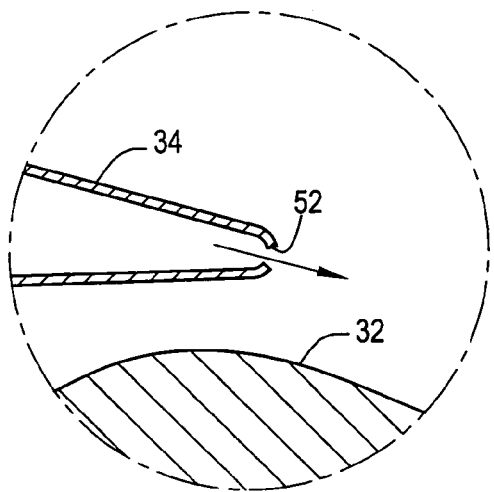
FIG.2
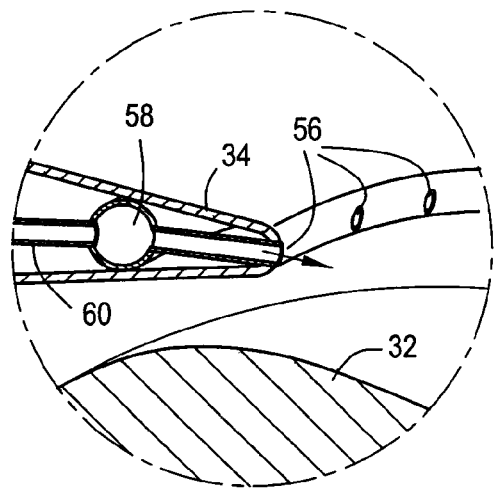
FIG.3
FIG.4
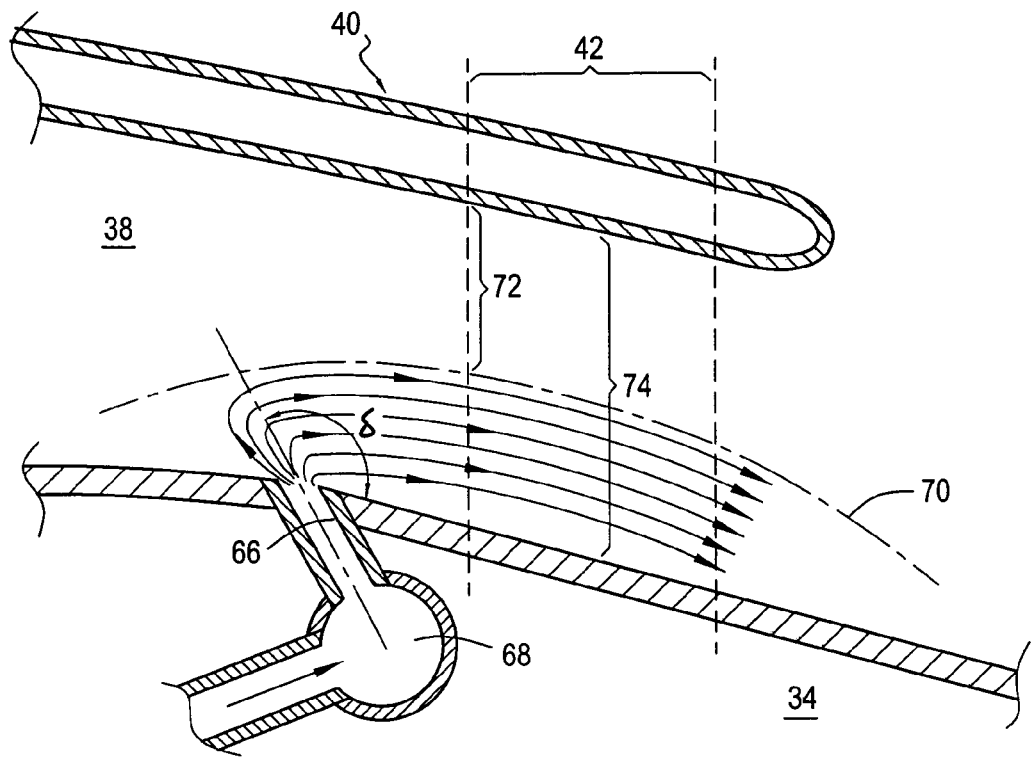

BYPASS TURBOMACHINE WITH ARTIFICIAL VARIATION OF ITS THROAT SECTION

BACKGROUND OF THE INVENTION

The present invention relates to the general field of the gas exhaust nozzle fitted to bypass turbomachines, and it relates more particularly to a turbomachine having a stationary nozzle in which the throat section can nevertheless be varied artificially.

A bypass turbomachine comprises in particular a gas turbine engine provided with a fan disposed on a longitudinal axis of the turbomachine, and with an annular nacelle centered on the longitudinal axis of the turbomachine and surrounding the engine, the nacelle having an upstream end surrounding the fan of the engine and a downstream end forming a nozzle for ejecting the gas coming from the turbomachine. The term "throat section" is used to designate the cross-section of the nozzle constituting its smallest cross-section along the entire length of the nozzle.

It is known that by varying the throat section of the nozzle of a turbomachine, it is possible to control the flow rate through the fan so as to place the fan in operating conditions that correspond to optimum efficiency at any operating speed of the turbomachine. The use of exhaust nozzles having a section that is geometrically variable is thus common practice in military applications. The techniques used generally have recourse to flaps disposed in line with the downstream end of the outer wall of the nozzle, with the flaps being steered to reduce or increase the section of the nozzle.

Unfortunately, those techniques are difficult to implement on the nozzles of turbomachines for civilian applications. This is due in particular to constraints associated with installing the nacelle relative to the wing of the airplane, to ground clearance, and to the thicknesses and shapes of the trailing edges of the nacelle. Furthermore, such variable section nozzles are relatively expensive to fabricate.

Thus, the nozzles used in civil aircraft generally have a throat section that is geometrically fixed and optimized for cruising flight since that represents the major fraction of the mission of an airplane. As a result, nozzles of fixed throat section operate in suboptimal manner when the engine is running at high speed (corresponding to takeoff and while the airplane is climbing), and while the engine is running at low speed (corresponding to descent, to the approach stage, and to the airplane idling in flight).

OBJECT AND SUMMARY OF THE INVENTION

The main object of the present invention is thus to mitigate such drawbacks by proposing a bypass turbomachine having a nozzle that is geometrically fixed but presenting throat section that can nevertheless be varied artificially depending on the operating speeds.

In accordance with the invention, this object is achieved by a turbomachine having air intake means for taking air from the cold stream flow channel of the turbomachine upstream from the throat section of the nozzle, and injector means for injecting the taken-in air downstream from the throat section of the nozzle so as to open the throat section artificially.

Thus, by injecting air downstream from the nozzle throat section, it is possible to increase artificially the rate at which air passes through said section, which amounts to opening the section of the nozzle while using the same geometrical section for the throat. This artificial variation in the throat section presents the advantages of requiring few parts, of being easy to install, and of being compatible with existing turbomachines. Another advantage lies in the possibility of improving noise levels.

The turbomachine of the invention also includes air intake means for taking in and compressing air from outside the turbomachine, and injector means for injecting the taken-in outside air into the vicinity of the throat section in a direction substantially perpendicular or even opposite to the flow direction of the air stream flowing in the cold stream flow channel so as to close the throat section artificially by aerodynamically obstructing the flow rate of air passing therethrough.

Thus, by injecting air into the vicinity of the throat section of the nozzle, it is possible to decrease artificially the rate at which air passes through said section, which amounts to closing the nozzle throat section while using the same geometrical section for the throat.

In a particular arrangement, the channel air intake means comprising a plurality of inlet orifices opening out into the cold stream flow channel and leading to an annular manifold housed inside the gas turbine engine, said manifold being connected to an inlet of a pump having an outlet opening out to the inside of the engine.

The gas turbine engine may include a primary cowl centered on the longitudinal axis of the turbomachine and a central body placed concentrically inside the primary cowl.

In one embodiment, the primary cowl presents an annular opening at its downstream end leading from the inside of the engine and opening out into the cold stream flow channel downstream from the nozzle throat section so as to enable the air taken from the cold stream flow channel to be exhausted by means of a pressure difference.

In another embodiment, the primary cowl presents a plurality of outlet orifices at its downstream end opening out into the cold stream flow channel downstream from the nozzle throat section and connected to the outlet of the pump via an annular diffuser so as to enable the air taken from the cold stream flow channel to be exhausted.

A control valve may advantageously be interposed between the manifold and the pump in order to regulate the rate at which channel air is taken in and injected downstream from the throat section.

In a particular arrangement, the outside air intake means comprise at least one outside air inlet open to the outside of the turbomachine and connected to an inlet of a pump having a compressor module and housed inside the gas turbine engine.

In another particular arrangement, the pump possesses an outlet connected via an annular diffuser to a plurality of air injectors opening out into the cold stream flow channel in the vicinity of its throat section in a direction that is substantially perpendicular or even opposite to the flow direction of the air stream flowing in said cold stream flow channel.

A control valve may advantageously be interposed between the outside air inlet and the pump in order to control the rate at which taken-in outside air is injected into the vicinity of the throat section.

The invention also provides a method of varying the throat section of a fixed-section nozzle in a bypass turbomachine, which method consists, for artificially opening the throat section, in taking air from the cold stream flow channel of the turbomachine upstream from the throat section and injecting that air into the nozzle downstream from the throat section in order to increase its effective section; and in order to artificially close the throat section, in taking air from outside the turbomachine, in compressing it, and in injecting it into the vicinity of the throat section along a direction that is substantially perpendicular or even opposite to the direction of the air stream flowing in the cold stream flow channel so as to create an aerodynamic obstruction to the flow of air passing through the throat section.

Preferably, the operations of opening and closing the throat section are controlled as a function of the operating speeds of the turbomachine.

BRIEF DESCRIPTION OF THE DRAWINGS

Other characteristics and advantages of the present invention appear from the following description made with reference to the accompanying drawings that show an embodiment having no limiting character. In the figures:

FIG. 2 is a view on a larger scale showing a detail of FIG. 1 showing means for injecting air downstream from the throat section in an embodiment;

FIG. 3 is another detail view showing means for injecting air downstream from the throat section in another embodiment; and FIG. 4 is a view showing another detail of FIG. 1 showing means for injecting air in the vicinity of the throat section in an embodiment.

DETAILED DESCRIPTION OF AN EMBODIMENT

Figure 1:
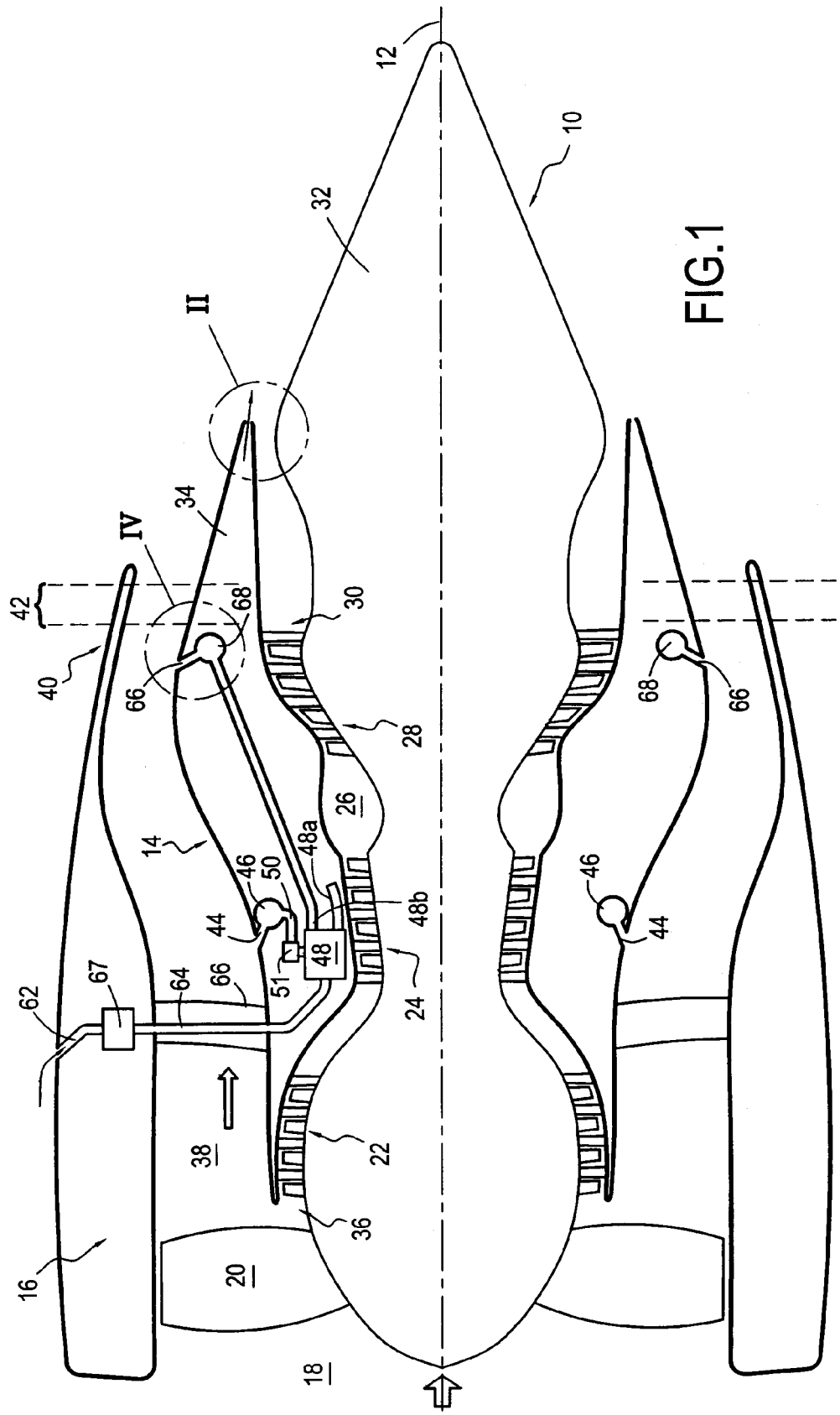
FIG. 1 is a highly diagrammatic longitudinal section view of a turbomachine of the invention.

FIG. 1 is a highly diagrammatic longitudinal section view of a bypass turbomachine 10 of the invention. It possesses a longitudinal axis 12 and is made up of a gas turbine engine 14 and an annular nacelle 16 centered on the axis 12 and disposed concentrically around the engine.

From upstream to downstream in the flow direction of a stream of air passing through the turbomachine, the engine 14 comprises an air inlet 18, a fan 20, a low-pressure compressor 22, a high-pressure compressor 24, a combustion chamber 26, a high-pressure turbine 28, and a low-pressure turbine 30, each of these elements being disposed on the longitudinal axis 12.

The gas turbine engine also comprises a central body 32 centered on the longitudinal axis 12 of the turbomachine and a primary cowl 34 likewise centered on the axis 12 and surrounding the central body so as to form downstream from the fan 20 an annular channel 36 referred to as the primary channel and through which there flows a hot stream.

The nacelle 16 of the turbomachine surrounds the primary cowl 34 of the engine and co-operates therewith to define an annular flow channel 38 for a cold stream and referred to as the secondary channel.

Air passes through the turbomachine as follows. Air is admitted into the turbomachine via the air inlet 18. Downstream from the fan 20, the stream of air splits into a portion that flows in the secondary channel 38 and another portion that follows the primary channel 36. In the primary channel, the air is compressed by compressors 22, 24, is mixed with fuel in the combustion chamber 26, and is burnt. The gas generated by this combustion drives the high-pressure turbine 28 and the low-pressure turbine 30.

At its upstream end, the nacelle 16 surrounds the fan 20 of the engine. The downstream end of the nacelle is stationary and forms a nozzle 40 for ejecting the gas streams coming from the turbomachine. The nozzle is defined radially outwards by the downstream end of the nacelle, and radially inwards by the primary cowl 34. The nozzle presents a throat section 42 which corresponds to its smallest cross-section.

According to the invention, provision is made to vary (i.e. to open or close) said throat section 42 artificially even though it is geometrically unchanging.

To open the throat section 42 artificially, the invention provides for taking air from the secondary channel 38 upstream from the throat section and injecting it into the nozzle 40 downstream from the throat section so as to increase its effective section. By such an operation, the flow rate of air passing through the throat section is increased, thereby having the consequence, for unchanged flow speeds, of artificially increasing the throat section (the flow rate is proportional to the section through which the air passes through multiplied by the speed of the air).

An embodiment of such an opening of the throat section is described below with reference to FIGS. 1 to 3.

The means for taking in air are formed by a plurality of inlet orifices 44 opening out into the secondary channel 38. These inlet orifices are formed through the primary cowl 34 and they are preferably regularly spaced apart around the longitudinal axis 12 of the turbomachine. As shown in FIG. 1, they may be inclined in the direction of air flow in the secondary channel.

The inlet orifices 44 open out into an annular air manifold 46 housed inside the engine 14 and centered on the longitudinal axis 12. This air manifold 46 is connected via at least one duct 50 to an inlet of a pump 48 that is likewise housed inside the engine. The pump 48 also presents an air outlet 48a. The pump serves to suck in air, but it may also incorporate a module for compressing air. A control valve 51 is preferably interposed between the air manifold 46 and the pump 48 in order to regulate the rate at which air is taken and injected upstream from the throat section, as a function of the operating speeds of the turbomachine.

In the embodiment of FIGS. 1 and 2, the means for injecting air into the nozzle 40 downstream from the throat section 42 comprise an annular opening (or slot) 52 formed in the downstream end of the primary cowl 34, said opening running from the inside of the engine and leading into the nozzle downstream from its throat section. Since the air pressure inside the engine is higher than outside, the air sucked in by the pump 48 propagates naturally from upstream to downstream inside the engine and is injected into the nozzle through the opening 52 in the primary cowl. It should be observed that if the pressure differential between the inside of the engine and the outside is not sufficient to enable air to be exhausted in this way, it may be necessary to compress the air that is taken in by integrating a compressor module in the pump.

FIG. 3 shows a variant embodiment of said air injector means. In this embodiment, the primary cowl 34 presents at its downstream end a plurality of outlet orifices 56 leading towards the secondary channel downstream from the throat section. These outlet orifices 56 are preferably uniformly spaced apart around the longitudinal axis of the turbomachine and they are connected to an annular diffuser 58 centered on the same axis. The diffuser 58 is connected to the outlet 48a of the pump 48 by at least one duct 60.

It should be observed that the inlet orifices could be replaced by a single annular slot, by scoops, by porous cavities, or by any other equivalent system enabling air to be taken in substantially uniform manner from around the entire circumference of the secondary channel. It should also be observed that provision can be made to close such inlet orifices when they are not in use, e.g. with the help of controlled hinged flaps.

The invention also makes provision to close the throat section 42 artificially. This operation consists in taking air from outside the turbomachine, compressing it, and injecting into the vicinity of the throat section 42 in a direction that is substantially perpendicular or even opposite to the flow direction of the stream of air in the secondary channel 38 so as to constitute an aerodynamic obstruction to the flow of air passing through the throat section.

An embodiment of such throat section closure means is described below with reference to FIGS. 1 and 4.

The means for taking outside air are formed by at least one outside air inlet 62 formed in the nacelle 16 of the turbomachine and opening to the outside thereof. This outside air inlet 62 is connected by at least one duct 64 passing through the secondary channel 38 and passing for example along one of the support arms 66 of the nacelle 16, to an inlet of a pump that has an air compressor module and that is housed inside the engine. Preferably, a control valve 67 is interposed between the outside air inlet 62 and the pump in order to regulate the flow rate of air that is taken and injected into the vicinity of the throat section, as a function of the operating speeds of the turbomachine.

As shown in FIG. 1, the pump may be the same as the pump used for taking air for use in the above-described operation of opening the throat section. Under such circumstances, the pump 48 has a compressor module for compressing the outside air that has been taken in prior to injecting it into the secondary channel.

The means for injecting outside air into the vicinity of the throat section comprise a plurality of air injectors 66 that are regularly spaced apart around the longitudinal axis 12 of the turbomachine and that lead into the secondary channel 38 in the vicinity of the throat section 42 along a direction that is substantially perpendicular or even opposite to the flow direction of the air stream in the secondary channel. The term "in the vicinity of the throat section" is used to indicate that the injectors open out immediately upstream from the throat section or indeed into the throat section (but not downstream therefrom).

To this end, the pump 48 possesses another outlet 48b which is connected to an annular diffuser 68 centered on the longitudinal axis 12 of the turbomachine and connected to the air injectors 66. In addition, as shown more precisely in FIG. 4, each air injector 66 is inclined at an angle δ formed relative to the flow inside the nozzle (going from upstream to downstream), which angle is not less than 90° and may be as great as 180° (which corresponds to injecting in a direction that is opposite to the flow direction of the air stream in the secondary channel).

By calibrating the rate at which air is delivered by the injectors 66, it is possible to create an aerodynamic obstruction to the air stream flowing through the throat section 42. As shown in FIG. 4, the air delivered by the injectors 66 penetrates into the secondary channel 38 and creates a constriction flow represented by line 70. Thus, when the air injectors 66 are active, the effective section 72 passing the air stream through the throat section 42 is reduced relative to its mean section 74 as observed when the injectors are not active. The amplitude of such a reduction in the effective section of the throat section is related directly to the rate at which air is delivered by the injectors 66 and to the angle of inclination (δ) of said injectors relative to the flow direction of the air stream flowing in the secondary channel. Decreasing the effective section of the throat section thus amounts to reducing the rate at which air flows therethrough, and thus to closing the throat section of the nozzle while retaining the same geometrical section for the throat.

It should be observed that the air injectors could be replaced by a single annular slot centered on the longitudinal axis of the turbomachine, or by any other equivalent system enabling air to be injected substantially uniformly around the circumference of the nozzle and in a direction that is at least perpendicular or even opposite to the flow direction of the air stream flowing in the secondary channel.

What is claimed is:

1. A bypass turbomachine comprising a gas turbine engine provided with a fan disposed on a longitudinal axis of the turbomachine, and with an annular nacelle centered on the longitudinal axis of the turbomachine and surrounding the engine in such a manner as to co-operate therewith to define an annular channel along which a cold stream flows on passing through the turbomachine, the nacelle having an upstream end surrounding the fan of the engine and a stationary downstream end forming a nozzle for ejecting the gas from the turbomachine, the nozzle having a throat section corresponding to its smallest cross-section, the turbomachine further comprising:

channel air intake means for taking air from the cold stream flow channel upstream from the throat section of the nozzle;

channel air injector means for injecting the taken-in channel air downstream from the nozzle throat section so as to open the throat section artificially;

outside air intake means for taking air from outside the turbomachine and for compressing said outside air; and outside air injector means for injecting the taken-in air into the vicinity of the throat section in a direction that is substantially perpendicular or opposite to the flow direction of the air stream in the cold stream flow channel so as to close the throat section artificially by aerodynamically obstructing the flow rate of air passing therethrough, wherein the outside air intake means comprise at least one outside air inlet open to the outside of the turbomachine and connected to an inlet of a pump having a compressor module and housed inside the gas turbine engine.

2. A turbomachine according to claim 1, in which the channel air intake means comprising a plurality of inlet orifices opening out into the cold stream flow channel and leading to an annular manifold housed inside the gas turbine engine, said manifold being connected to an inlet of a pump having an outlet opening out to the inside of the engine.

3. A turbomachine according to claim 2, in which the gas turbine engine has a primary cowl centered on the longitudinal axis of the turbomachine, and a central body disposed concentrically inside the primary cowl, the primary cowl having an annular opening at its downstream end leading from the inside of the engine and opening out into the cold stream flow channel downstream from the nozzle throat section so as to enable the air taken from the cold stream flow channel to be exhausted by means of a pressure difference.

4. A turbomachine according to claim 2, in which the gas turbine engine has a primary cowl centered on the longitudinal axis of the turbomachine, and a central body disposed concentrically inside the primary cowl, the primary cowl having a plurality of outlet orifices at its downstream end opening out into the cold stream flow channel downstream from the nozzle throat section and connected to the outlet of the pump via an annular diffuser so as to enable the air taken from the cold stream flow channel to be exhausted.

5. A turbomachine according to claim 2, further including a control valve interposed between the manifold and the pump.

6. A turbomachine according to claim 1, in which the pump possesses an outlet connected via an annular diffuser to a plurality of air injectors opening out into the cold stream flow channel in the vicinity of its throat section in a direction that is substantially perpendicular or even opposite to the flow direction of the air stream flowing in said cold stream flow channel.

7. A turbomachine according to claim 1, further including a control valve interposed between the outside air inlet and the pump.

8. A method of varying the throat section of a nozzle of fixed section in a bypass turbomachine, said method comprising:

for artificially opening the throat section, taking air from the cold stream flow channel of the turbomachine upstream from the throat section and injecting that air into the nozzle downstream from the throat section in order to increase its effective section; and in order to artificially close the throat section, taking air from outside the turbomachine, compressing said outside air, and injecting said compressed outside air into the vicinity of the throat section along a direction that is substantially perpendicular or even opposite to the direction of the air stream flowing in the cold stream flow channel so as to create an aerodynamic obstruction to the flow of air passing through the throat section, wherein opening and closing the throat section are controlled as a function of the operating speeds of the turbomachine.

* * * * *